(12) United States Patent
Kalinin et al.

(10) Patent No.: US 11,487,780 B2
(45) Date of Patent: Nov. 1, 2022

(54) PROCESSING DATA BETWEEN DATA STORES

(71) Applicant: ENTIT SOFTWARE LLC, Sanford, NC (US)

(72) Inventors: Alexander Kalinin, Palo Alto, CA (US); Alkis Simitsis, Palo Alto, CA (US); Kevin Wilkinson, Palo Alto, CA (US); Mahashweta Das, Palo Alto, CA (US)

(73) Assignee: MICRO FOCUS LLC, Sanford, NC (US)

(*) Notice: Subject to any disclaimer, the term of this patent is extended or adjusted under 35 U.S.C. 154(b) by 827 days.

(21) Appl. No.: 15/773,395

(22) PCT Filed: Nov. 4, 2015

(86) PCT No.: PCT/US2015/059120
§ 371 (c)(1),
(2) Date: May 3, 2018

(87) PCT Pub. No.: WO2017/078710
PCT Pub. Date: May 11, 2017

(65) Prior Publication Data
US 2018/0322179 A1 Nov. 8, 2018

(51) Int. Cl.
*G06F 16/25* (2019.01)
*G06F 16/248* (2019.01)
(Continued)

(52) U.S. Cl.
CPC ............ *G06F 16/258* (2019.01); *G06F 9/544* (2013.01); *G06F 16/248* (2019.01); *G06F 16/25* (2019.01); *G06F 16/284* (2019.01)

(58) Field of Classification Search
CPC .......................... G06F 16/258; G06F 16/284
See application file for complete search history.

(56) References Cited

U.S. PATENT DOCUMENTS

| 8,674,993 B1 | 3/2014 | Fleming et al. |
| 9,053,210 B2 | 6/2015 | Elnikety et al. |
| (Continued) | | |

FOREIGN PATENT DOCUMENTS

KR 101525529 6/2015

OTHER PUBLICATIONS

Fan, J. et al.; "The Case Against Specialized Graph Analytics Engines"; Jan. 4-7, 2015; 10 pages.
(Continued)

*Primary Examiner* — Khanh B Pham

(57) ABSTRACT

A non-transitory computer readable medium can store machine readable instructions that when accessed and executed by a processing resource cause a computing device to perform operations. The operations can include establishing a connection between data stores (such as a relational data store and a graph engine), wherein the connection includes a shared memory buffer storing data in a data format according to internal structures of the graph engine. The connection between the data stores is bi-directional. The connection enables data that is stored in the shared memory to be processed by either of the graph engine and the relational database. Upon receiving a query, the graph engine or the relational database can be selected to process the data based on a query. The data can be processed by the selected one of the graph engine or the relational database.

20 Claims, 8 Drawing Sheets

(51) Int. Cl.
*G06F 16/28* (2019.01)
*G06F 9/54* (2006.01)

(56) References Cited

U.S. PATENT DOCUMENTS

| | | |
|---|---|---|
| 2004/0174397 A1 | 9/2004 | Cereghini et al. |
| 2005/0138006 A1 | 6/2005 | Bennett et al. |
| 2008/0243908 A1 | 10/2008 | Aasman |
| 2010/0118039 A1 | 5/2010 | Labour |
| 2010/0241644 A1 | 9/2010 | Jackson et al. |
| 2014/0172914 A1 | 6/2014 | Elnikety et al. |
| 2014/0201234 A1* | 7/2014 | Lee .................... G06F 16/9024 707/769 |
| 2015/0081739 A1* | 3/2015 | Xu ...................... G06F 16/256 707/792 |
| 2015/0081741 A1 | 3/2015 | Xu |
| 2015/0310129 A1* | 10/2015 | Ushijima ................ G06F 16/25 707/798 |
| 2016/0092527 A1* | 3/2016 | Kang .................. G06F 16/9024 707/756 |
| 2017/0212931 A1* | 7/2017 | Chen .................... G06F 16/245 |

OTHER PUBLICATIONS

International Searching Authority., International Search Report and Written Opinion dated Aug. 2, 2016 for PCT Application No. PCT/US2015/059120 Filed Nov. 4, 2015, 14 pages.

Jindal, A. et al.; "Vertexica: Your Relational Friend for Graph Analytics"; Sep. 1-5, 2014; 4 pages.

* cited by examiner

PROCESSING DATA BETWEEN DATA STORES

BACKGROUND

Enterprises use relational databases to store operational data and historical data. The enterprises analyze this operational data and historical data using a variety of algorithms, some of which are more efficiently processed within a graph engine or other type of specialized processing engine. One example of a graph engine can include a graph database that utilizes graph structures (with edges, nodes and properties) to represent and store data.

DETAILED DESCRIPTION

This disclosure relates to systems and methods to provide data movement between data stores of different types. For example, the data stores can include a relational database and a graph engine or other specialized processing engine. In some examples, an enterprise may use a relational database to store data, including operational data and historical data. Sometimes, however, the data stored in the relational database may be processed more efficiently within a graph engine or other specialized processing engine. In order to process the data in the graph engine, the data stored in a relational format of the relational database must be converted to a graph format stored in the graph engine. The time required for the conversion and data movement can be prohibitive. The systems and methods of the present disclosure can reduce the time required for the conversion and data movement.

As used herein, a graph engine (also known as a graph database) refers to a database that uses graph structures for semantic and other queries with nodes, edges and properties to represent and store data. Thus, the graph engine implements a database having internal data structure based on graph theory, employing nodes, edges and related properties. For example, the nodes can represent entities (e.g., people, accounts or other items). Edges can connect nodes to nodes or nodes to properties and, for example, can represent a relationship between the objects they interconnect. The properties include pertinent information relating to the nodes or graph structure itself. Generally, compared with relational databases, graph engines are often faster for associative data sets and tend to map more directly to the structure of object-oriented applications.

The systems and methods disclosed herein can include a connector that can provide a high-performance connection between the relational database and the graph engine. The connector uses a shared-memory and a convertor (or more than one convertor) for directly transforming from a relational database format to graph engine format and/or from graph engine format to the relational database format. The transformed data in the shared memory can be accessed via memory location identifiers (e.g., uniform resource locators, or URLs), for such data to enable access and further processing of the data in the graph engine format. As disclosed herein, the further processing can include using the data by a graph engine calculator, exporting the data from the shared memory into a separate graph structure, converting the data into the relational database format as well as appending or modifying the data.

Figure 1:
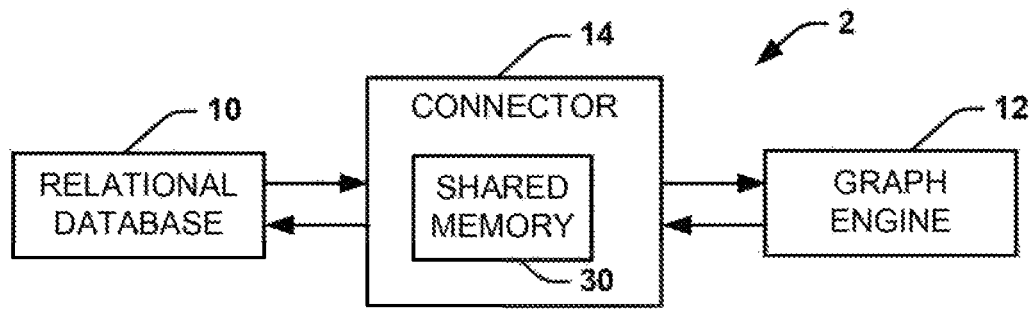
FIG. 1 illustrates an example of a system that facilitates data movement between data stores of different formats.

FIG. 1 illustrates an example of a system 2 that facilitates data movement between data stores of different types, each storing data in different formats. The system 2 can reduce time and resource usage for the data movement, thereby enabling better utilization of both data stores and better service for end users. In some examples, the system 2 may be implemented by a computing device that includes at least a non-transitory memory and a processing resource (e.g., a processing core).

As shown in the example of FIG. 1, the data stores can be a relational database 10, which stores relational data in a relational data format, and a graph engine 12, which stores data in a graph engine format. Although illustrated and described as a graph engine 12, system 2 can facilitate data movement between the relational database 10 and any type of specialized data processing engine. For example, the specialized data processing engine can be used for graph processing, array processing, signal processing, video processing, or the like.

The system 2 includes a connector 14 established between the relational database 10 and the graph engine 12. In some examples, the connector 14 can be bi-directional. The connector 14 can provide high-bandwidth and low-latency, while mitigating overhead associated with moving data between the data stores 10 and 12. The connector 14 can include a shared memory buffer, shown in the system 2 as shared memory 30. The shared memory buffer will be referred to hereinafter as shared memory 30.

The connector 14 can be programmed to transform relational data into the graph engine format according to internal data structures of the graph engine 12. For example, the internal data structures of the graph engine 12 can include a graph structure that represents or stores data in terms of edges, nodes and properties.

The connector 14 can also be programmed to convert the data in the shared memory 30 in the graph engine format into the relational data format of the relational database 10. This data transformation between the relational database 10 and the graph engine 12 is very efficient since the shared memory 30 stores the data in a predetermined graph engine format that is compatible with the graph engine 12. Additionally, access to the data in the shared memory can be enabled by location identifiers (e.g., URLs, memory address or other types of references to where the data is stored). Other parameters associated with the data are stored as metadata in the shared memory to facilitate use and manipulation of such data.

As an example, the graph engine 12 can access the transformed data in the shared memory 30 based on the location identifiers and manipulate data in the graph engine format within the shared memory. The resulting modified data thus can remain within the shared memory at specified memory locations, as provided by corresponding location identifiers. For instance, the graph engine 12 can execute data processing functions (e.g., graph calculator function) with respect to the transformed data, such can result in modifying (e.g., appending or deleting) vertices and/or edges of the graph structure defined by the data in the shared memory. The access and manipulation of the data in the shared memory by the graph engine and the relational database can be facilitated by the location identifiers to memory locations in the shared memory. Because data transfer with the connector 14 is so efficient, the connector 14 can allow the relational database 10 to off-load, selectively, computation to the graph engine 12 or vice versa (from the graph engine to the relational database. The connection thus can enhance services for users (e.g., applications) of both the relational database 10 and the graph engine 12. For example, the connection can be utilized to enable queries to be processed in an expedited manner.

As another example, the connector 14 can be created by employing a user-defined function (UDF), which may allow applications to execute code within context of the relational database 12. In some examples, the graph engine 12 can be embedded as a UDF in the relational database 10. The graph engine 12 running as an embedded UDF inside the relational database 10 can provide for significant performance advantages, for example, by eliminating context switches between the relational database 10 and the graph engine 12. Additionally or alternatively, application programming interfaces (APIs) can be implemented in the graph engine 12 to provide for access to the relational database through the connector 14.

Figure 2:
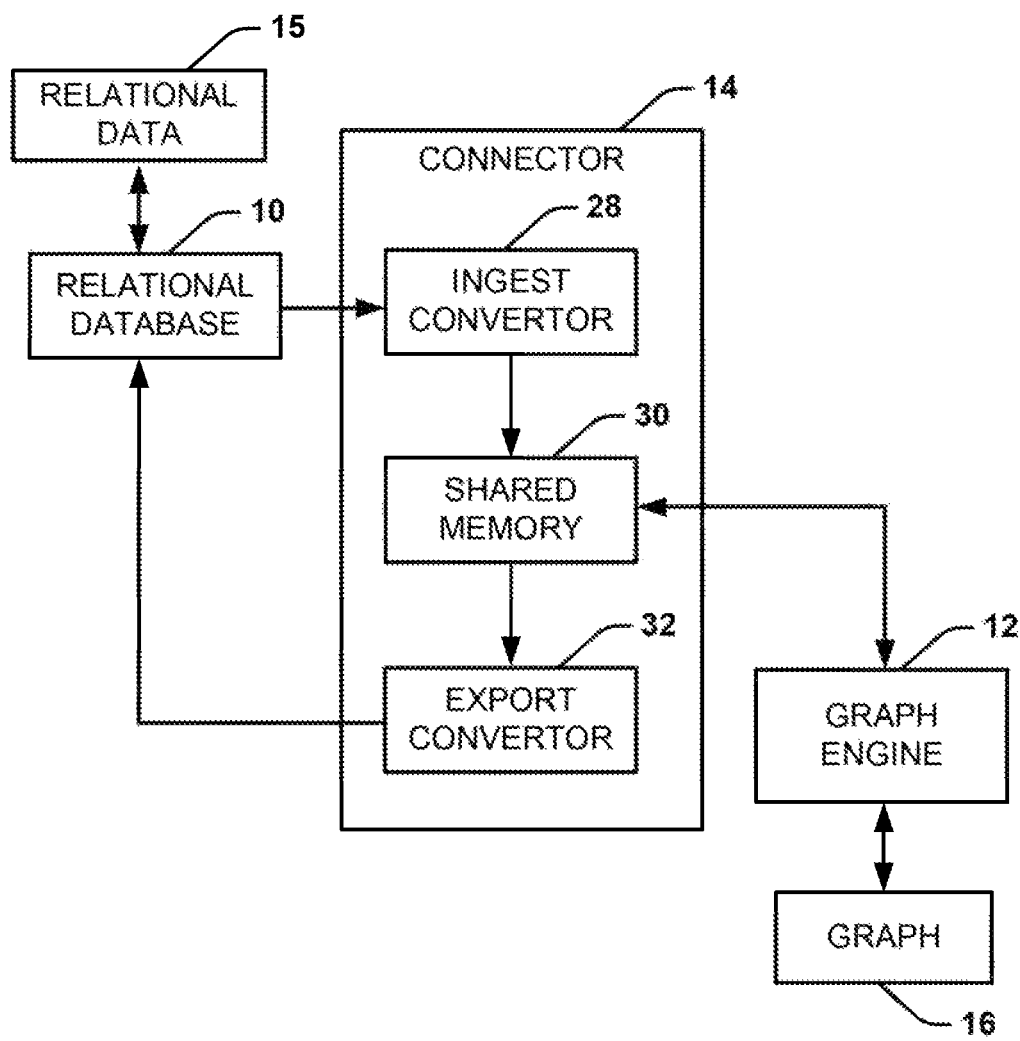
FIG. 2 illustrates an example of a connector that can establish a connection between a relational database and a graph engine.

In the example of FIG. 2, the connector 14 can also include an ingest convertor 28 and an export convertor 32. The ingest convertor 28 and the export convertor 32, in some examples, can be embodied as UDFs within the relational database 10. The ingest convertor 28 can ingest relational data 15 from the relational database 10 and convert the ingested data into the format corresponding to the internal data structures of the graph engine 12. As mentioned, the transformed data can be stored in the shared memory 30. The graph engine 12 can perform actions on the converted data within the shared memory. Alternatively, the graph engine can import the transformed data, process such data and send the resulting processed data back to the shared memory in the graph engine data. The export convertor 32 can access data from the shared memory 30 (e.g., via a function call that includes location identifiers for the data), convert the data into the relational data format and export the data to the relational database 10.

Figure 3:
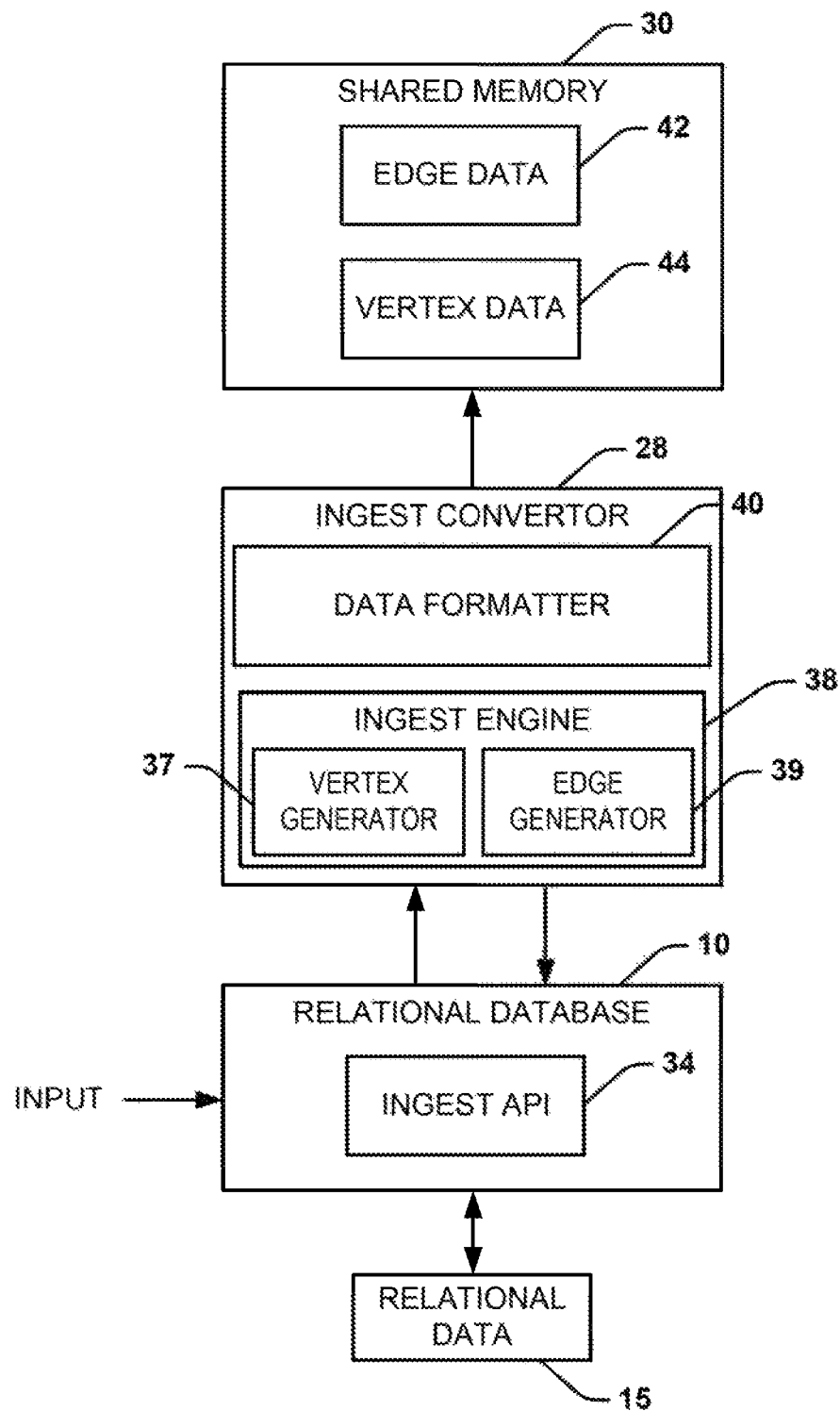
FIG. 3 illustrates an example of an ingest convertor of a connector that can be formed between a relational database and a graph engine.

An example of the ingest convertor 28 is shown in FIG. 3. The relational database 10 can receive an input to an ingest API 34 to initiate the transformation of data into the graph engine data format and to store the transformed in the shared memory 30. In some examples, the input can include an identification of at least a portion of the relational data 15 that is to be converted to graph engine format. The ingest API 34 can communicate with the ingest convertor 28. In some examples, the ingest API 34 can be invoked by the relational database or another application (e.g., a query engine). In response to invoking the ingest API, the ingest convertor can perform actions on the at least the portion of the relational data 15 before it is sent to the ingest convertor 28. For example, the actions can include pre-shuffling the at least the portion of the relational data 15 to put the data into a better condition for generation of vertices and edges corresponding to the data structure of the graph engine.

In the example of FIG. 3, the ingest engine 38 of the ingest convertor 28 includes a vertex generator 37 and an edge generator 39. The vertex generator 37 can convert the portion of the relational data 15 into vertex data 44 (and accompanying metadata) that is stored in the shared memory 30. The edge generator 39 can convert the portion of the relational data 15 into edge data 42 (and accompanying metadata). The vertex data and edge data can be written into and stored in the shared memory buffer 30. The edge data 42 and the vertex data 44 can each be identified by an identifier, so that the graph engine 12 can access the edge data 42 and the vertex data 44 in the shared memory. For example, the identifiers can be a URL, a memory address location or other identifier that provides a reference to the edge data 42 and the vertex data 44 in the shared memory. The identifiers can be fed back from the ingest convertor 28 to the relational database 10 and/or to another application that invoked the ingest API 34. The graph engine 12 or other application can use the identifiers to access the vertex data 44 and the edge data 42, such as disclosed herein (see, e.g., FIGS. 4, 5 and 6).

The ingest engine 38 of the ingest convertor 28 can work in combination with the data formatter 40 of the ingest convertor 28 to transform the identified at least a portion of the relational data 15 to the graph engine format according to internal data structures of the graph engine. The formatter can be programmed to constrain the edge data 42 and the vertex data 44 according to the data structure implemented by the graph engine 12.

Figure 4:
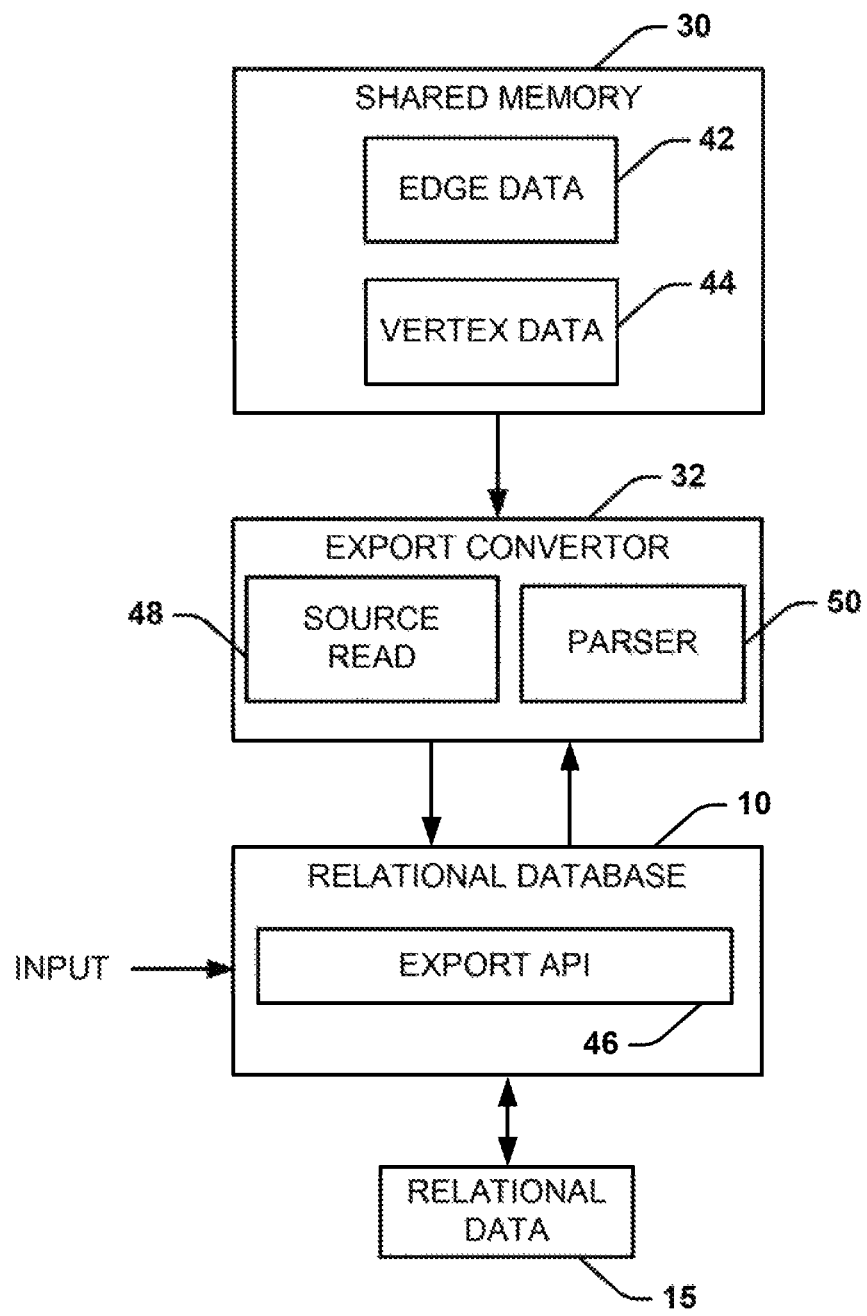
FIG. 4 illustrates an example of an export convertor of a connector that can be formed between a relational database and a graph engine.

An example of the export convertor 32 is shown in FIG. 4. The export convertor is programmed to convert data in the shared memory from the graph engine format to the relational data format. An export API 46 of the relational database can be implemented (e.g., by the relational database or by an application) to invoke the export convertor 32 for transforming data from the shared memory into the relational data format. For example, the export API 46 can specify to the export convertor 32 identifiers for the edge data 42 and vertex data 44 in the shared memory. The export API 46 thus can return the corresponding relational data to be stored in the relational database 10. In the example of FIG. 4, the export convertor 32 can include a source read function 48 and a parser function 50. The source read function 48 can read data (e.g., the edge data 42 and vertex data 44) from the shared memory 30 based on the identifiers. The parser 50 function can parse the data into the relational data 15, which has the relational data format that can be read by and manipulated the relational database 10. The parser function 50 can also load the data into the relational database 10 so that the data can be read and manipulated.

Figure 5:
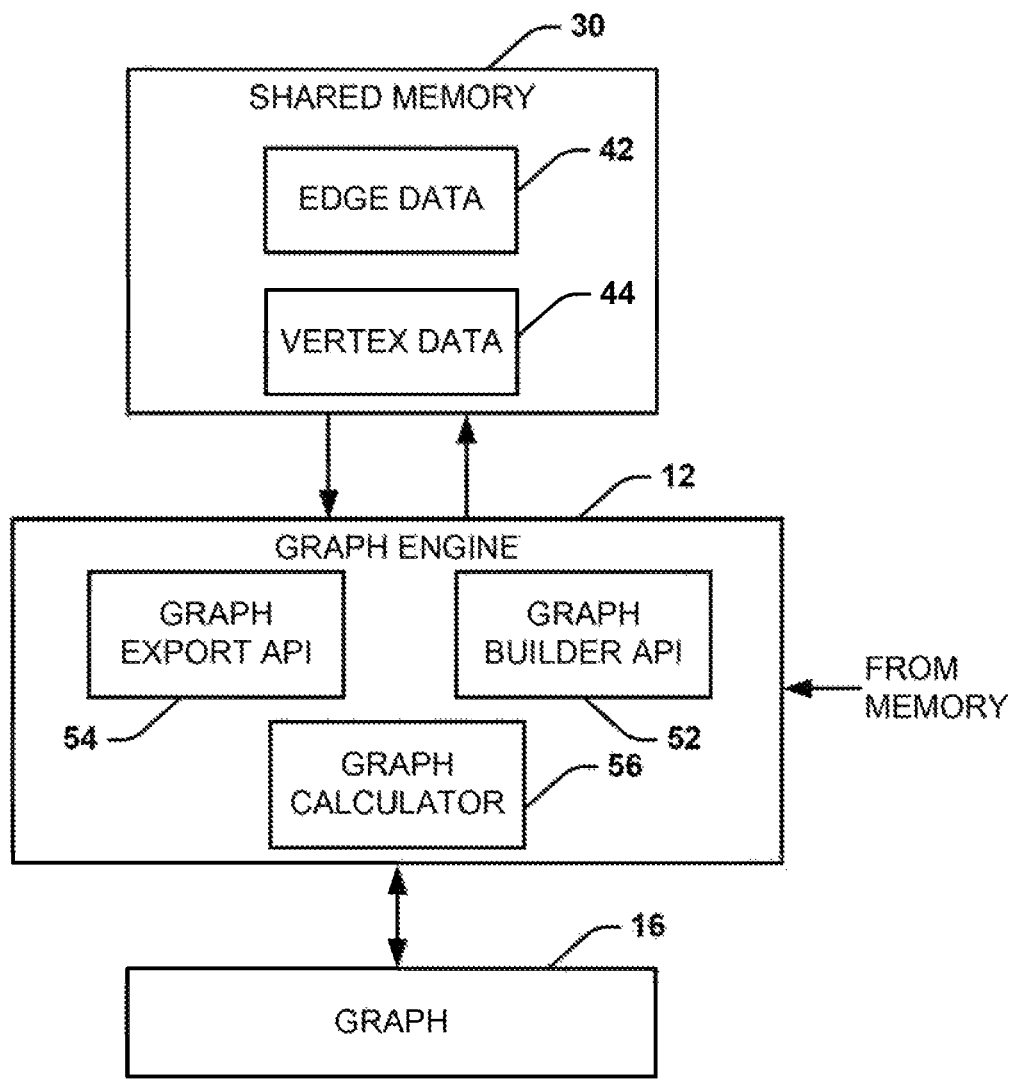
FIG. 5 illustrates an example of a graph engine that can process data from a relational engine in a graph engine format.

FIG. 5 illustrates an example of the graph engine 12, which can communicate with the shared memory 30 to access the data in the format consistent with the graph engine format (e.g., edge data 42 and vertex data 44). In the example of FIG. 5, the graph engine includes a graph builder API 52, a graph export API 54 and a graph calculator 56.

The graph builder API 52 can be utilized by the graph engine or another application (e.g., via function call) to generate the graph 16. The graph 16 can be stored in a local memory or remote (external) memory relative to the graph engine 12. The graph 16 includes objects in the form of vertices and edges according to the data structure of the graph engine 12. Depending on the call, the graph builder API 52 can generate the graph 16 as a blank graph or include corresponding data at its objects. As an example, the graph builder API 52 can be called by an application for generating the graph 16, such as to facilitate processing by the graph calculator 56 or other functions.

The graph export API 54 can be utilized to export data from the shared memory in the graph engine format into the graph 16. As mentioned, the graph 16 can include data or be a blank graph. In some examples, the graph export API 54 can include the identifiers that specify the locations of the data (e.g., edge data 42 and vertex data 44) in the shared memory 30 and retrieve the data from the locations in the shared memory. Thus, instead of manipulating the data in the shared memory via the identifiers, the graph engine the graph engine 12 can perform a calculation, or other data processing directly on data objects of the graph 16.

As a further example, the graph calculator 56 can employ processing resources to perform calculations on data in the graph engine format. The calculations can include a preprogrammed function or set of functions to create or edit the data in the shared memory. In some examples the graph calculator can be applied to data in the shared memory 30. Since the identified data (e.g., identified by location identifiers) in the shared memory has the graph engine format, the graph calculator 56 can process (e.g., append or modify) the data while it remains within the shared memory. The resulting updated graph thus can remain in shared memory 30, unless exported into the graph 16 by the graph export API 54 or exported into the relational database (e.g., by the export convertor 32 of FIG. 4).

In other examples, the graph calculator 56 can perform calculations or other processing can be based on creating, appending, or modifying the graph 16. The resulting updated or created graph 16 can be traversed to provide corresponding results. The results can be provided to the relational database and/or to the shared memory. As a further example, the graph engine 12 can also move the graph or a portion thereof into the shared memory 30, which results in generating corresponding identifiers and metadata for such data, as disclosed herein.

Figure 6:
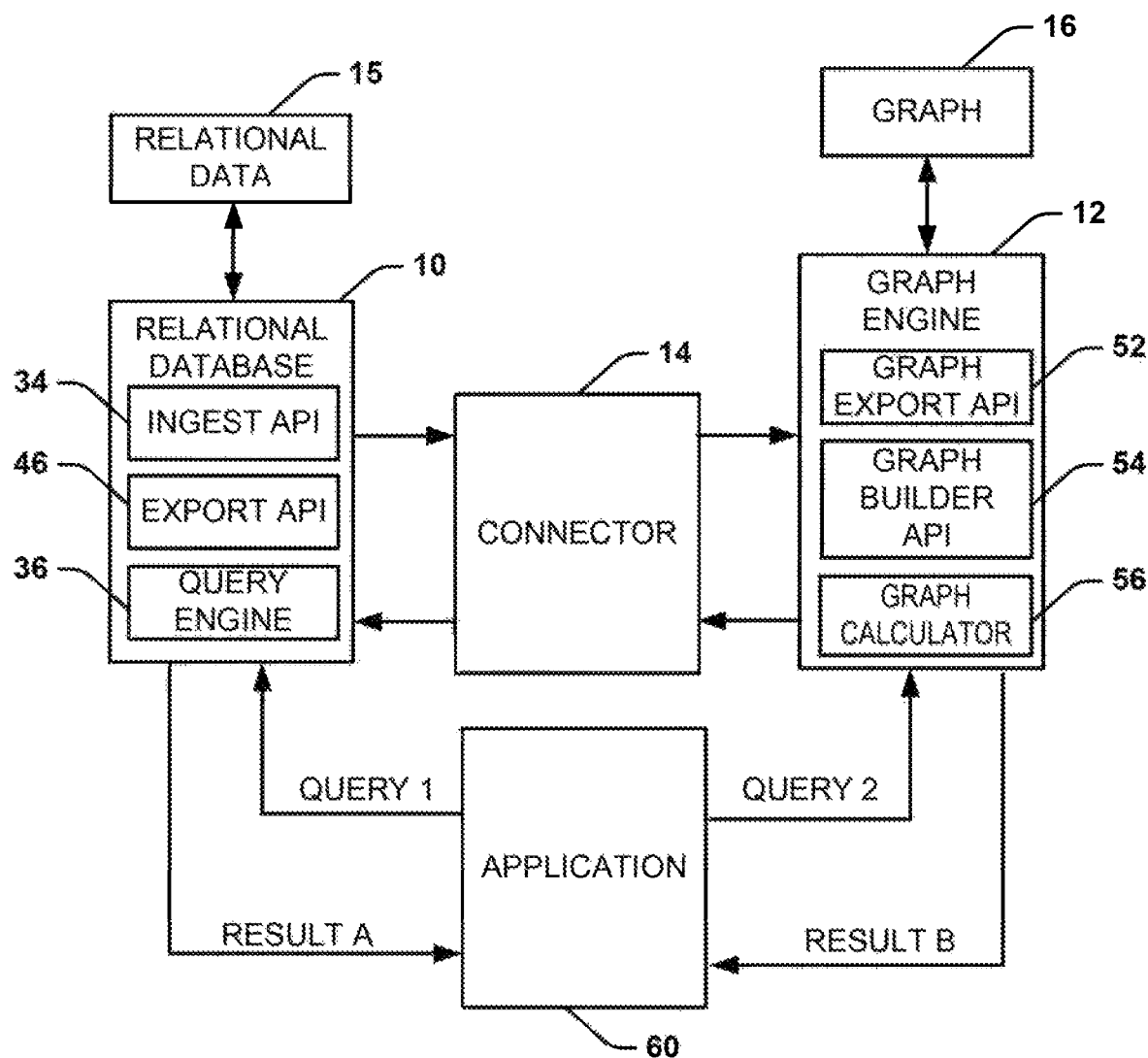
FIG. 6 illustrates an example of an application utilizing a system that facilitates data movement between a relational database and a graph engine.

FIG. 6 depicts an example of an application 60 utilizing a system, which as disclosed herein includes the relational database 10 coupled to the graph engine 12 via connector 14. The connector 14 can be especially useful with regard to processing a query from the application 60, such as can include one query to the relational database 10 and can deliver another query to the graph engine 12.

In the example of FIG. 6, the relational database 10 includes a query engine 36 to process query 1, which can include determining which of the relational database 10 and the graph engine 12 would be able to more efficiently process the query. The query engine 36 can make this determination based on the type of computations to be performed. For instance, certain types of computations (e.g., recursive operations) are better suited for processing by the graph engine, whereas other types of computations are handled more efficiently by a relational database. If the query engine 36 determines that the relational database 10 should handle the query, then the relational database 10 accesses the relational data 15, performs an appropriate action, and returns results of the query to the application 60. However, if the query engine 36 determines that the graph engine 12 would be able to handle the query more efficiently, then data from the relational database 10 is sent through the connector 14 to the graph engine 12.

As disclosed herein, for example, an ingest API 34 of the relational database 10 can communicate with the connector 14 to transform the relational data 15 into a graph engine format according to internal data structures of the graph engine 12. The transformed data (e.g., edge data 42 and vertex data 44) can be stored in the shared memory 30 of the connector 14. The graph engine 12 can access the data in the shared memory 30 to perform the calculation and/or processing based on the query using a graph 16. For example, the application 60 can provide the graph engine 12 identifiers to access the data from the shared memory 30. The graph engine 12 can then perform the processing (e.g., via graph calculator 56) on the data provided in the graph engine format, which can be based on the identifiers while the data is in the shared memory of the connector 14 or after data has been exported (e.g., by graph export API 54) into the graph 16.

The result of the processing or calculation conducted by the graph engine 12 can be returned to the application in appropriate format. As an example, the result can be stored into the shared memory 30. An export API 46 of the relational database 10 can access the result in the shared memory based on the associated location identifiers and convert the result from the graph format into relational data 15 having the relational data format. The result (result A) can be reported back to the application 60 by the relational database 10. Alternatively, the graph engine 12 can communicate the results (result A) directly to the application 60.

In other examples, the application 60 can deliver query 2 to the graph engine 12. The graph engine 12 can process the query (e.g., via graph calculator 56) and return a result back to the application 60, such as in situation where the graph engine is determined to be capable to process the query 2 with sufficient efficiency. However, if it is determined that the graph engine cannot process query by itself, the graph engine 12 can send the request via the connector 14 for processing of the query by the relational database 10. The graph engine can ingest data from graph 16 into the shared memory 30 of the connector 14, which data (e.g., edge data and vertex data 44) can be referenced in the shared memory 30 by corresponding location identifiers. The export API 46 of the relational database 10 can convert the data in the shared memory in the graph engine format into corresponding relational data 15. The relational database 10 can determine results for the query by processing the relational data 15. The processed data can be sent through the connector 14 and ingested into the shared memory 30 through the ingest API 34. The processed data can be retrieved from the shared memory by the graph engine 12 and reported to the application 60 (e.g., as result B). Alternatively, the relational database 10 can communicate the results (result B) directly to the application 60.

Figure 7:
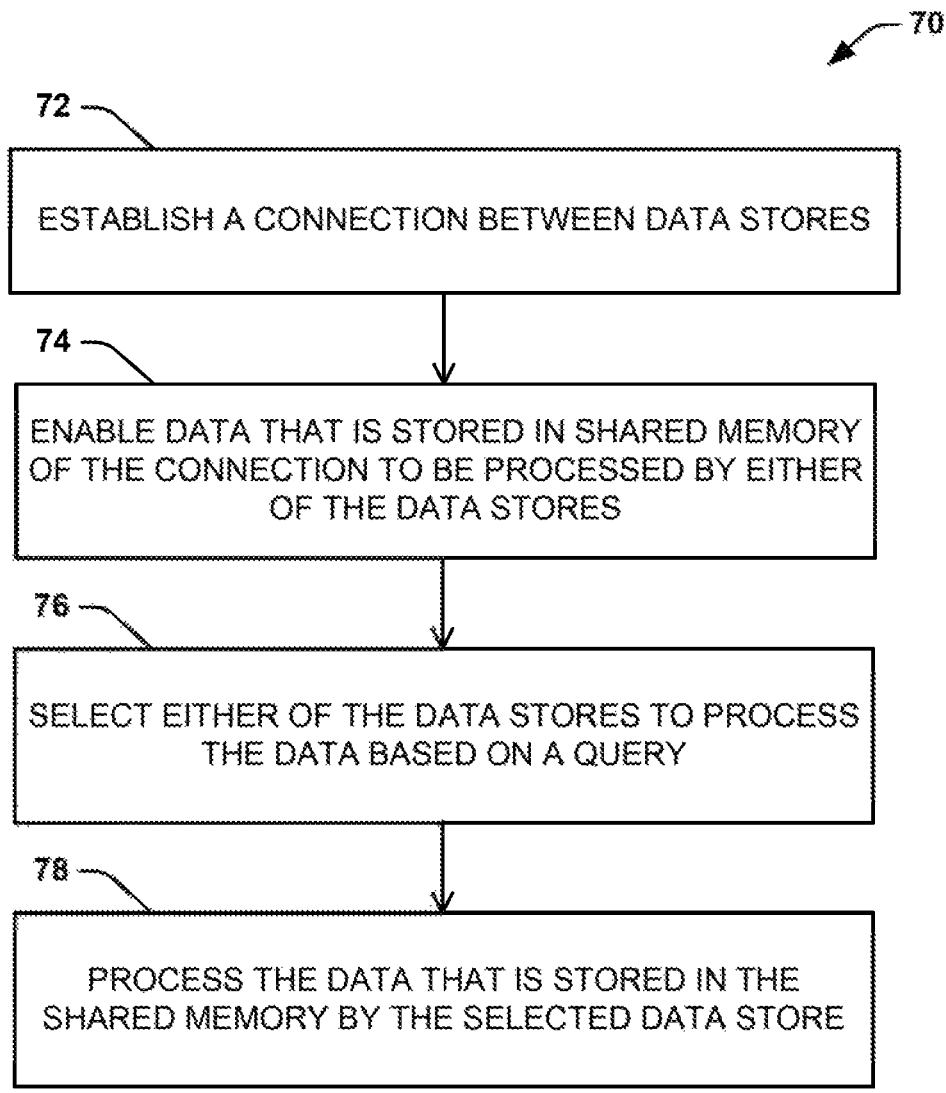
FIG. 7 illustrates a flowchart of an example method for data movement between a relational database and a graph engine.
Figure 8:
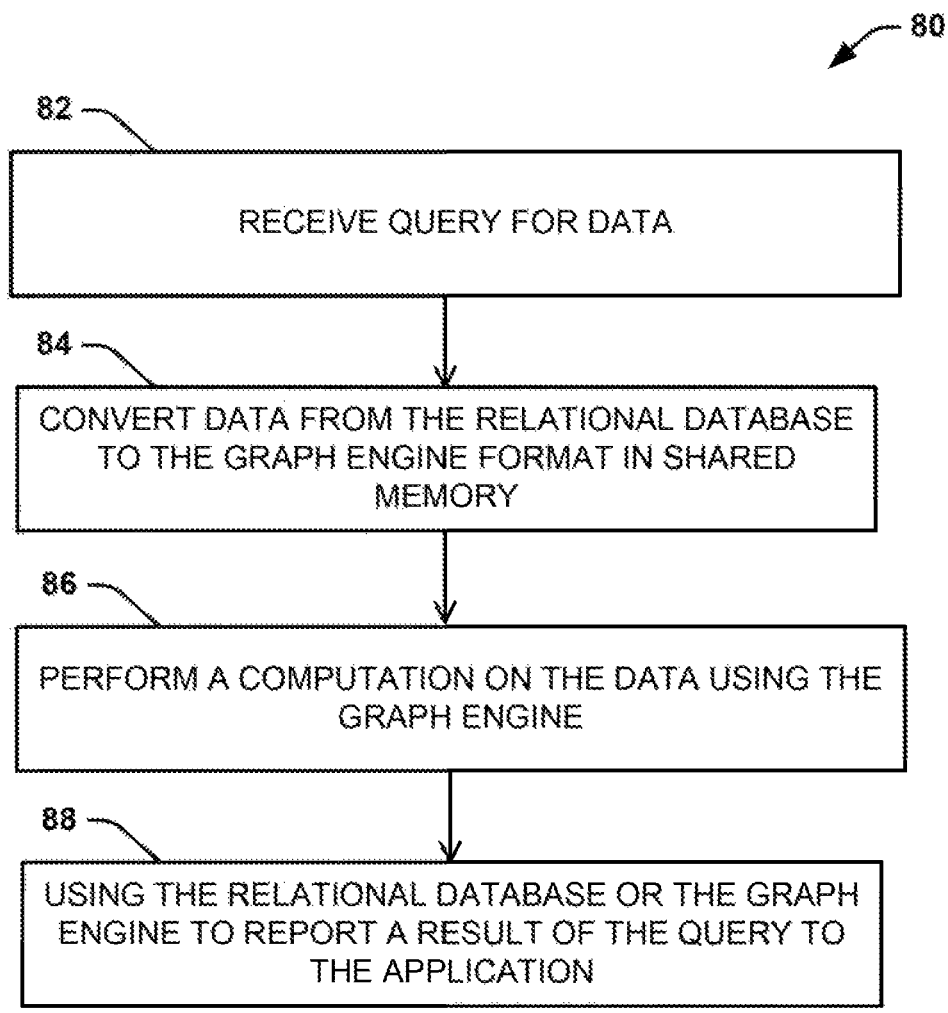
FIG. 8 illustrates a flowchart of an example method for processing a query between a relational database and a graph engine.

In view of the foregoing structural and functional features described above, example methods will be better appreciated with reference to FIGS. 7-8. While, for the purposes of simplicity of explanation, the example methods of FIGS. 7-8 are shown and described as executing serially, the present examples are not limited by the illustrated order, as some actions could in other examples occur in different orders and/or concurrently from that shown and described herein. Moreover, it is not necessary that all described actions be performed to implement a method. The method can be stored in a non-transitory computer-readable medium and executed by a processing resource, such as disclosed herein.

FIG. 7 illustrates flowchart of an example method 70 for data movement between data stores of different formats. For example, method 70 can be executed by a system (e.g., systems shown in FIGS. 1-6) that can include a processor and a non-transitory memory that stores machine executable instructions and a processing resource to access the non-transitory memory and execute the instructions to cause a computing device to perform the method 70.

At 72, a connection (e.g., connector 14) can be established between data stores (e.g., a relational database 10 and a graph engine 12 or a different type of specialized processing engine). The connection can be an efficient connection between the two data stores that uses a shared memory (e.g., shared memory 30) to mitigate the data shipping and function shipping overhead between the two data stores (e.g., by using fewer computational resources than other data sharing techniques, like serializing the data into files or using an industry-standard connector, like ODBC).

At 74, the connection (e.g., connector 14) can enable data that is stored in the shared memory (data stored in a relational format from the relational database 10 or data stored in a graph format from the graph engine 12). At 76, either of the data stores (e.g., the relational database 10 or the graph engine 12) can be selected to process the data. At 78, the selected data store can process the data that is stored in the shared memory buffer (e.g., shared memory 30).

The data store that is selected to do the processing can access the data from the shared memory buffer (e.g., shared memory 30) using corresponding identifiers to facilitate processing and manipulation of such data in the shared memory. The method 70 can reduce time and resource usage for the data movement, thereby enabling better utilization of both the relational database and graph engine and better service for end users. Indeed, the connector can allow the relational database to off-load more computation to the graph engine, thus providing better services for users of both systems (e.g., graph requests are processed faster and, since the relational database has a reduced load, relational database requests are processed faster as well).

FIG. 8 illustrates flowchart of an example method 80 for processing a query received from an application (or client, user, or the like). Although the example of method 80 includes a computation that is performed by a graph engine on data from a relational database, it will be understood that the data could be from the graph engine and processed in the relational database using a similar process. For example, method 80 can be executed by a system (e.g., the system shown in FIGS. 1-6) that can include a non-transitory memory that can include a non-transitory memory that stores machine executable instructions and a processing resource to access the non-transitory memory and execute the instructions to cause a computing device to perform the method 80.

At 82, a query for data can be received. For example, the query can come from the application, client using the application, a relational database, a graph engine, or the like. The query can be received by the relational database, in some examples, and the relational database can determine whether the relational database or the graph engine to which it is coupled via a connection is better suited to process the query or a subset of the query. In other examples, the query can be received by the graph engine, which can perform a similar determination. However, in this example, the query is received at the relational database. Accordingly, at 84, data can be converted from the relational database to the graph engine format according to the internal data structure of the graph engine. The data can be ingested into shared memory of a connector (e.g., connector 14) established between the relational database (e.g., relational database 10) and the graph engine (e.g., graph engine 12). The connector can include a shared memory (e.g., shared memory 30) that stores data in the format consistent with that of the graph engine. The graph engine thus can process the data in the shared memory directly via identifiers referencing location of such data. At 86, a computation (or other processing) can be performed on the data using the graph engine. At 88, the result of the query can be reported back to the application using either the relational database or the graph engine, such as disclosed herein.

Figure 9:
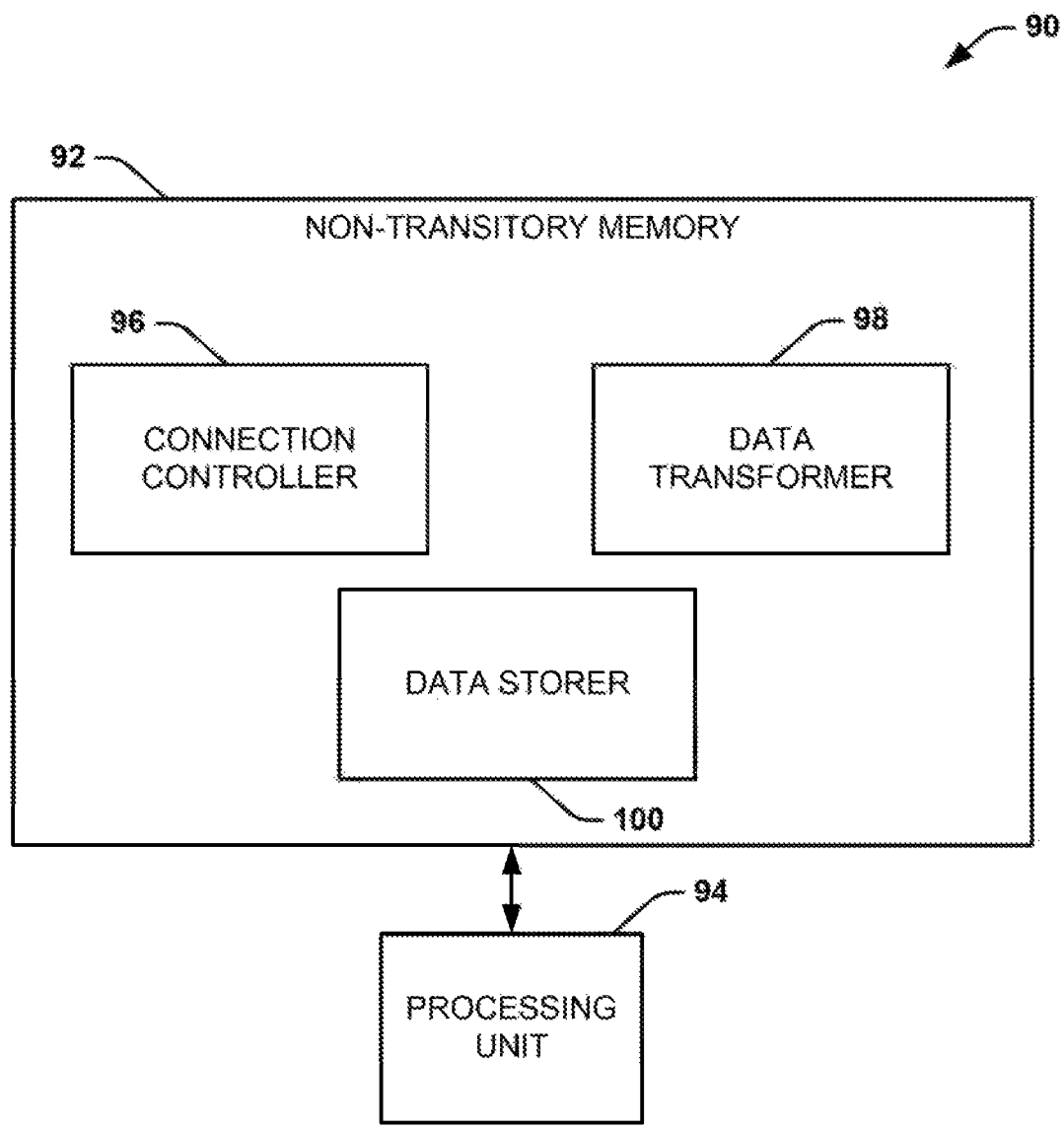
FIG. 9 illustrates another example of a system to facilitate data movement between a relational database and a graph engine.

FIG. 9 illustrates an example of a system 90 that facilitates data movement between data stores of different formats, like a relational data store 10 and a graph engine 12. System 90 may comprise a non-transitory memory 92 to store machine-readable instructions. The system 90 may also comprise a processing unit 94 to access the non-transitory memory 92 and execute the machine-readable instructions.

The non-transitory memory may store machine-readable instructions and data, including at least a portion of the system 90. Examples of the non-transitory memory can include volatile memory (e.g., RAM), nonvolatile memory (e.g., a hard disk, a flash memory, a solid state drive, or the like), or a combination of both. The processing resource (e.g., a processing core) may access the non-transitory memory and execute the machine-readable instructions to implement functions of the system 90. In other instances, the non-transitory memory 92 and the processing unit 94 may implement functions of the connector 14 of FIGS. 1-6, including the shared memory 30, the ingest convertor 28, the export convertor 32, and the like. In some examples, the computing device can also include an interface (e.g., a user interface) that includes a user input device (e.g., keyboard, mouse, microphone, etc.) and/or a display device (e.g., a monitor, a screen, a graphical user interface, speakers, etc.).

The machine-readable instructions may comprise a connection controller 96 to establish or terminate a connection between a relational database and a graph engine. The relational database stores data in a relational data format and the graph engine stores data in a graph engine data format. The machine-readable instructions may also comprise a convertor 98 to transform relational data from the relational database into a graph engine format according to internal data structures of the graph engine. The machine-readable instructions may also comprise a data storer 100 to store the transformed data in the shared memory buffer of the connection. The graph engine 12, in some examples, can access the transformed data in the graph engine format via corresponding identifiers and perform operations (e.g., calculations or further processing) on the transformed data.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory computer readable medium to store machine readable instructions that, when accessed and executed by a processing resource, cause a computing device to perform operations, the operations comprising:
   establishing a connection between data stores, wherein the data stores comprise a relational database and a graph engine, wherein the connection comprises a shared memory buffer storing first data in a data format according to internal data structures of the graph engine, and wherein the connection is bi-directional;
   enabling the first data to be processed by the graph engine;
   determining whether the graph engine or the relational database is to process a query;
   selecting the graph engine to process the query based on a result of the determination; and
   processing the query, wherein the processing comprises the graph engine processing the first data.

2. The non-transitory computer readable medium of claim 1, wherein the graph engine is embedded within the relational database.

3. The non-transitory computer readable medium of claim 1, wherein the processing further comprises:
   receiving, at the relational database from an application, the query;
   converting the first data from a first format corresponding to the relational database to a second format corresponding to the graph engine to provide converted data using the internal data structures;
   performing a computation on the converted data using the graph engine, wherein the computation is based on the query; and
   using the relational database or the graph engine to report a result of the processing.

4. The non-transitory computer readable medium of claim 3, further comprising:
   using the relational database to report the result of the processing.

5. The non-transitory computer readable medium of claim 1, the operations further comprising:
   transforming the first data from a first format corresponding to the relational database into a graph engine format corresponding to the graph engine to provide transformed data according to the internal data structures, wherein the transforming comprises:
      ingesting the first data into the shared memory buffer as vertex data and edge data corresponding to the transformed data;
      generating a location identifier for the vertex data and generating a location identifier for the edge data; and
      accessing the vertex data and the edge data from the shared memory buffer.

6. The non-transitory computer readable medium of claim 5,
   wherein the accessing is performed by the graph engine, and
   wherein the graph engine processes the vertex data and the edge data.

7. A system comprising:
   a non-transitory memory to store machine-readable instructions; and
   a processing resource to access the memory and execute the machine-readable instructions, wherein the machine-readable instructions, when executed by the processing resource, cause the processing resource to:
      establish a bi-directional connection between a relational data store and a graph engine, wherein the bi-directional connection comprises a shared memory buffer, and the shared memory buffer stores data in a data format according to internal data structures of the graph engine;
      transform relational data from a relational data format to a graph engine format according to the internal data structures to provide transformed data, and store the transformed data in the shared memory buffer, wherein the transformed data comprises vertex data and edge data; and
      select the graph engine to process the vertex data and the edge data in response to a query received at the relational data store.

8. The system of claim 7, wherein the graph engine is embedded within the relational data store to facilitate exporting the relational data.

9. The system of claim 7, wherein the graph engine is to perform at least one of graph processing, array processing, signal processing, or video processing.

10. The system of claim 7, wherein the machine-readable instructions, when executed by the processing resource, further cause the processing resource to ingest the relational data from the relational data store.

11. The system of claim 7, wherein the machine-readable instructions, when executed by the processing resource, further cause the processing resource to access the edge data and the vertex data from the shared memory buffer and transform the edge data and the vertex data to correspond to the relational data format.

12. The system of claim 11, wherein the graph engine accesses the edge data and the vertex data based on location identifiers provided to the graph engine via an application interface.

13. The system of claim 7, further comprising an application to provide the query, wherein the relational data store comprises a query engine to determine whether to perform processing on the relational data of the relational data store or to pass the query to the graph engine for processing by the graph engine.

14. The system of claim 13, wherein, the machine-readable instructions, when executed by the processing resource, further cause the processing resource to:
   in response to the query engine determining to pass the query to the graph engine, transform the relational data into the graph engine format and store the relational data as the edge data and the vertex data in the shared memory buffer, wherein the application provides the graph engine with location identifiers for the edge data and the vertex data to enable processing thereof by the graph engine.

15. A method comprising:
   receiving, at a relational database from an application, a query;
   transforming first data from the relational database to a graph engine format according to internal data structures of a graph engine to provide transformed data, the transformed data being stored in a shared memory of a bi-directional connection between the relational database and the graph engine;
   providing location references to the graph engine for accessing the transformed data in the shared memory;
   performing a computation on the transformed data in the graph engine format using the graph engine, wherein the computation is based on the query; and
   using the relational database or the graph engine to report a result of the query to the application.

16. The method of claim 15, wherein the graph engine is embedded within the relational database.

17. The method of claim 15, wherein the transforming comprises:
ingesting the first data into the shared memory as vertex data and edge data;
generating a location identifier for the vertex data and generating a location identifier for the edge data; and
accessing the vertex data and the edge data from the shared memory.

18. The method of claim 15, wherein the performing comprises performing at least one of graph processing, array processing, signal processing, or video processing.

19. The method of claim 15, further comprising using the relational database to report the result.

20. The non-transitory computer readable medium of claim 1, wherein determining whether the graph engine or the relational database is to process the query comprises determining which of the graph engine and the relational database will more efficiently process the query.

* * * * *